United States Patent [19]
Ibing et al.

[11] 3,870,743
[45] Mar. 11, 1975

[54] PREPARATION OF AROMATIC DINITRILES

[75] Inventors: Gunther Ibing, Gladbeck; Kurt Neubold, Bottrop, both of Germany

[73] Assignee: Veba-Chemie AG, Gelsenkirchen-Buer, Germany

[22] Filed: June 17, 1970

[21] Appl. No.: 47,875

[30] Foreign Application Priority Data
June 18, 1969 Germany.............................. 1930880

[52] U.S. Cl............... 260/465 C, 252/467, 252/469
[51] Int. Cl................... C07c 121/02, C07c 121/54
[58] Field of Search.................. 260/465 C; 252/467

[56] References Cited
UNITED STATES PATENTS
2,833,807   5/1958   Farkas et al. ....................... 260/465

3,370,081   2/1968   Sennewald et al.................. 260/465
3,452,077   6/1969   Caporali et al. .................... 260/465

FOREIGN PATENTS OR APPLICATIONS
1,277,839   9/1968   Germany

*Primary Examiner*—Lewis Gotts
*Assistant Examiner*—Dolph H. Torrence
*Attorney, Agent, or Firm*—Burgess, Dinklage & Sprung

[57]                ABSTRACT

In the production of nitriles of aromatic dicarboxylic acids by the reaction of alkyl-substituted benzenes with oxygen and ammonia at elevated temperatures, the improvement which comprises employing as catalyst a mixture of vanadium and molybdenum oxides on an alumina carrier, which has been activated by a compound of at least one of cerium, chromium, manganese, tungsten, bismuth, tin, antimony, titanium, lithium, sodium and potassium.

9 Claims, No Drawings

PREPARATION OF AROMATIC DINITRILES

The invention refers to a method for the production of nitriles of aromatic dicarboxylic acids, especially of iso- and terephthalic acid and mixtures of both, by reaction of correspondingly alkyl-substituted benzenes with molecular oxygen in the presence of ammonia in the gas phase at elevated temperature in the presence of catalysts containing vanadium- and molybdenum oxides.

The general reaction between alkylbenzene, ammonia and oxygen is already known. Some of the hitherto described processes provide a nitrogen atmosphere, or addition of steam, or effect only partial conversion in order to obtain a higher selectivity with respect to the dinitrile formation, which variants necessitate a cumbersome and uneconomical separation of the complex reaction products.

In the known processes, in addition to the dinitriles there are also produced alkyl mononitriles and other impurities which are strongly colored. Thereby, the results are altogether unsatisfactory; either there are formed an excessively large amount of by-products or total combustion takes place to such an extensive degree as to make it impossible to maintain constant reaction conditions. Also the excess ammonia is totally burned, so that the yields are poor also with respect to the converted ammonia. All of the known processes have the further disadvantage that the loads, and thus the space-time-yields, are low.

It is accordingly an object of the present invention to provide an improved process for the conversion of alkylbenzenes to nitriles of aromatic dicarboxylic acids in reasonably simple fashion and high yield and efficiency.

This and other objects are realized in accordance with the invention which effects the conversion of alkylbenzene by its contact, together with ammonia and oxygen, with a catalyst comprising a mixture of vanadium oxide and molybdenum oxide on an active alumina carrier, which has been activated by the addition of a compound of one or more of the elements cerium, chromium, manganese, tungsten, bismuth, tin, antimony, titanium, lithium, sodium and potassium. The mole ratio of the vanadium oxide to the molybdenum oxide ranges from about 0.5–2:1 and preferably they are present in approximately equimolar proportions. All computed as oxides by weight, the activating element may comprise from about 0.1 to 50% or more of the vanadium and molybdenum oxides, preferably from about 15 to 35%. The amount of the active material in the catalyst may range from about 2 to 20% and preferably about 4 to 10% by weight, i.e. the alumina in the total catalyst, advantageously comprises about 80 to 98% and preferably about 90 to 96% by weight of the catalyst. Preferably the alumina comprises any commercial grade γ-$Al_2O_3$ having a surface of about 50 to 150 square meters per gram.

The process of the invention not only permits working at appreciably higher loads than heretofore possible, but surprisingly, even without inert gas or steam addition, there is achieved almost complete hydrocarbon conversion with production of dinitrile of great purity in high yields. Not only are the yields calculated on the hydrocarbon consumed very high, but the yields calculated on converted ammonia are also very satisfactory, for in spite of the large excess of oxygen the entire excess ammonia is not burned; a large portion of the excess ammonia leaves the reaction zone unchanged and can be recovered from the waste gas. Alternatively, if the oxygen source is fresh air and suitable adjustment is made, the waste gas containing unreacted ammonia and oxygen can be re-cycled in whole or in part to the reactor in place of a portion of the fresh air which would otherwise be provided. In this waste gas recycle the small amount of organic compounds present in the gas is totally burned due to the large excess of oxygen; carbon dioxide in such recycle gas is no problem as it is inert and carbon monoxide is converted to the dioxide. It is also important that hydrocyanic acid only occurs in traces in the waste gas.

The preparation of the catalyst takes place in the usual manner, for example by impregnating the active alumina with a concentrated hydrochloric acid solution of water-soluble salts of the active substances, drying at about 150°C. and heating in a stream of air at about 350° to 400°C. for about 24 hours.

The conversion to dinitriles may be carried out in the same solid bed reactors in which phthalic acid- or maleic acid anhydride are customarily produced.

The reaction temperatures may range between about 300 and 600, especially between about 300 and 550 and preferably between about 400° and 480°C., the exact value depending upon the composition of the catalyst.

The mole ratio of ammonia to alkylbenzene hydrocarbon ranges between about 4 to 14 with about 8 to 12 being preferred for maximum yields. Higher ratios do not increase the yields and require larger, more costly equipment to handle the greater volumes.

The mole ratio of oxygen to alkylbenzene hydrocarbon is not critical and can vary within wide limits. A large excess of oxygen, as is used in accordance with the invention, is not disadvantageous for the reaction and does not result in uncontrollable total combustion of ammonia and reaction products, when specific reaction conditions are maintained. The oxygen is preferably introduced in the form of air and since, in general, an inert atmosphere is not necessary, regulation of the air supply can serve to regulate the contact or residence time between reactants and catalyst which ranges from about 0.1 to 4 seconds and preferably about 0.5 to 2 seconds. In practicing the invention, in place of air as the source of gaseous oxygen there can be employed oxygen mixed with nitrogen and/or steam.

Under these conditions throughputs ranging between about 10 and 300 grams of alkylbenzene per hour per liter of catalyst are possible, with especially favorable yields being obtained between about 140 and 200.

The reaction products are condensed in usual manner by cooling of the reaction gases, whereby there is obtained a white solid product containing a small amount of moisture, which product upon drying consists of at least 99.5% of dinitrile. By simple washing of the raw product with a lower alkyl alcohol or ketone, e.g. isopropanol, butanol, methanol or acetone, at room temperature and subsequent drying, there is obtained pure dinitrile at yields by weight of 80 to 100% calculated on the dialkylbenzene consumed, e.g. paraxylene to terephthalodinitrile.

The process is suited not only for the ammono-oxidation of pure p-xylene, m-xylene or mixtures of both, but also for the ammono-oxidation of very crude p- and m-xylenes and mixtures thereof, as well as of other dialkylbenzenes.

Iso- and terephthalodinitrile are technically valuable compounds; they can be converted by acid or alkali hydrolysis to the corresponding diamides and further into iso- and terephthalic acids, or by hydrogenation into the corresponding xylylenediamines, all of which compounds are important in the production of polymers for synthetic fibers, films and moldings, e.g. polyesters, polyimides and epoxy resins.

The invention will be further described in the following illustrative examples wherein all parts are by weight unless otherwise expressed.

EXAMPLE 1

The catalyst is produced in the following manner:
6.06 g $NH_4VO_3$ and 6.92 g $(NH_4)_6Mo_7O_{24} \cdot 4 H_2O$ are dissolved by heating in 40 ml of concentrated HCl. By dissolving 4.41 g $Ce(SO_4)_2 \cdot 4 H_2O$ in 27 ml of concentrated HCl at 40°C., a second solution is produced. The two solutions are admixed at 40°C. Then, 176 g $\gamma$-$Al_2O_3$ (purity: 99%, surface: 80 m²/g) are added to this solution with stirring, whereby the solution is quantitatively taken up by the carrier. The alumina is dried at 150°C. and placed into the ammono-oxidation apparatus comprising a steel tube having a length of about 1 meter, an inner diameter of 1.96 cm and a volume of 189 ml; for 24 hours an air stream at 360°C. is passed over the catalyst. The resulting catalyst contains 2.5% $V_2O_5$, 3.0% $MoO_3$ and 1.0% $CeO_2$.

A gas mixture having a composition in volume percent of 0.63% p-xylene, 5.30% ammonia and 94.07% air (volume ratio 1:8.4:149.3) is passed through the tube-reactor at a throughput velocity of 5140 liters per hour per liter of catalyst (153.5 grams of p-xylene per hour per liter of catalyst, residence or contact time = 0.7 second), while the tube is immersed in a salt bath at a temperature of 392°C. Within the tube, the reaction temperature is about 460°C.

The reaction product is condensed in the usual manner, washed with water, then methanol, and dried. There is obtained practically pure terephthalodinitrile at a yield of 90.7% by weight, calculated on the xylene addition. The yield was still at the same level even after 4 months of uninterrupted operation.

EXAMPLE 2

The catalyst is produced in the following manner:
6.12 g $NH_4VO_3$, 7.0 g $(NH_4)_6Mo_7O_{24} \cdot 4 H_2O$ and 2.98 g $SbCl_3$ are dissolved by heating in 40 ml of concentrated HCl. By dissolving 4.46 g $Ce(SO_4)_2 \cdot 4 H_2O$ in 27 ml of concentrated HCl at 40°C. a second solution is produced. The two solutions are admixed at 40°C. and the catalyst production proceeded as in Example 1. The catalyst so produced contains 2.5% $V_2O_5$, 3.0% $MoO_3$, 1.0% $CeO_2$ and 1.0% $Sb_2O_3$.

Over the catalyst in the same apparatus as in Example 1 there is conducted a gas mixture whose composition by volume is 0.77% p-xylene, 7.22% ammonia and 92.05% air (volume ratio: 1:9.84:125.8) with a throughput velocity of 4690 liters per hour per liter of catalyst (163 grams of xylene per hour per liter of catalyst, contact time = 0.77 seconds), while the tube is immersed in a salt bath at a temperature of 402°C. Within the tube the reaction temperature is 460°C.

After the isolation and working up of the reaction product as in Example 1, there is obtained practically pure terephthalodinitrile at a yield by weight of 95.4% calculated on the xylene input. These yields remained practically the same after 6 months of continuous operation.

EXAMPLE 3

6.12 g $NH_4VO_3$, 5.83 g $(NH_4)_6Mo_7O_{24} \cdot 4 H_2O$ and 7.46 g $SbCl_3$ are dissolved in 67 ml of concentrated HCl. With stirring, 176 g of $\gamma$-$Al_2O_2$ are impregnated with this solution, dried at 150°C. and tempered in the oxidation apparatus for 24 hours with an air stream at 360°C. The thus produced catalyst contains 2.5% $V_2O_5$, 2.5% $MoO_3$ and 2.5% $Sb_2O_3$.

Over the catalyst contained in the same apparatus as in Example 1 there is conducted a gas mixture comprising by volume 1.08% p-xylene, 9.88% ammonia and 89.04% air (volume ratio: 1:9.25:82.5) with a throughput velocity of 5140 liters per hour per liter of catalyst (260 g xylene per hour per liter of catalyst, residence time = 0.7 second) while the tube is immersed in a salt bath kept at a temperature of 392°C. Within the catalyst tube, the reaction temperature is 480°C.

After the isolation and working up of the reaction product as in Example 1, one obtains practically pure terephthalodinitrile at a yield by weight of 87.8% calculated on the xylene input.

EXAMPLE 4

With the same catalyst and under the same reaction conditions as in Example 2, m-xylene is subjected to ammono-oxidation.

The condensed reaction products are washed with water, then isopropanol and dried. One obtains practically pure isophthalodinitrile at a yield by weight of 80.5%.

EXAMPLE 5

Over the same catalyst as in Example 2 and in the same apparatus as in Example 1, one conducts a gas mixture with the composition by volume of 0.81% m-p-xylene (97.3%; 69.1% m-xylene, 28.2 p-xylene), 8.13% ammonia and 91.06% air (volume ratio: 1:10.04:112.5) with a throughput velocity of 4800 liters per hour per liter of catalyst (187 g xylene per hour per liter of catalyst, residence time = 0.74 second), while the tube is immersed in a salt bath kept at 410°C. Within the tube the reaction temperature is 470°C.

The condensed reaction products are washed with water, then isopropanol and dried. There is obtained a yield by weight of 81.2% of pure product comprising 69.1% isophthalodinitrile and 30.9% terephthalodinitrile.

It will be appreciated that the instant specification and examples are set forth by way of illustration and not limitation and that various modifications and changes may be made without departing from the spirit and scope of the present invention.

What is claimed is:

1. In the production of nitriles of aromatic dicarboxylic acids by the reaction of dialkyl-substituted benzenes with oxygen and ammonia at elevated temperature, the improvement which comprises employing as catalyst a mixture of vanadium and molybdenum oxides on alumina as carrier, which has been activated by about 0.1 to 50% of the combined weights of molybdenum and vanadium oxide of at least one of cerium, chromium, manganese, tungsten, bismuth, tin, antimony, titanium, lithium, sodium and potassium oxides, the mole ratio of vanadium oxide to molybdenum oxide ranging from about 0.5–2:1.

2. A process according to claim 1, wherein the alumina comprises γ-alumina having a surface of about 50 to 150 square meters per gram.

3. A process according to claim 1, wherein the rate of throughput ranges from about 10 to 300 grams of alkylbenzenes per hour per liter of catalyst.

4. A process according to claim 1, wherein per mole of alkylbenzene there are provided about 4 to 14 moles of ammonia and about 5 to 240 moles of oxygen.

5. A process according to claim 1, wherein the contact time between catalyst and reactants ranges from about 0.1 to 4 seconds.

6. A process according to claim 1, including the further step of subjecting the crude product to washing with water, and then to washing with a lower alkyl alcohol or ketone.

7. A process according to claim 6, wherein the alkylbenzene is xylene, the vanadium oxide and molybdenum oxide are provided in approximately equimolar amounts, the alumina comprises about 90 to 96% by weight of the catalyst and comprises γ-alumina having a surface of about 50 to 150 square meters per gram, the rate of throughput ranges from about 140 to 200 grams of alkylbenzenes per hour per liter of catalyst, the temperature ranges from about 400° to 500°C., there are provided about 8 to 12 moles of ammonia and about 10 to 50 moles of oxygen per mole of alkylbenzene, and the contact time between catalyst and reactants ranges from about 0.5 to 1.5 seconds.

8. A process according to claim 1, wherein the activator comprises cerium oxide.

9. A process according to claim 1, wherein the activator comprises antimony oxide.

\* \* \* \* \*